(12) United States Patent
Hall

(10) Patent No.: US 11,077,705 B2
(45) Date of Patent: Aug. 3, 2021

(54) PAINTBRUSH CLIP

(71) Applicant: Christopher Michael Hall, Milwaukie, OR (US)

(72) Inventor: Christopher Michael Hall, Milwaukie, OR (US)

( * ) Notice: Subject to any disclaimer, the term of this patent is extended or adjusted under 35 U.S.C. 154(b) by 43 days.

(21) Appl. No.: 15/091,132

(22) Filed: Apr. 5, 2016

(65) Prior Publication Data
US 2017/0282636 A1    Oct. 5, 2017

(51) Int. Cl.
*B44D 3/12* (2006.01)
*F16B 2/22* (2006.01)
*F16B 1/00* (2006.01)

(52) U.S. Cl.
CPC ............. *B44D 3/123* (2013.01); *F16B 1/00* (2013.01); *F16B 2/22* (2013.01); *F16B 2001/0035* (2013.01)

(58) Field of Classification Search
CPC .... F16B 1/00; F16B 2/22; F16B 47/00; F16B 45/00; A47G 1/17; A46B 17/02; A46B 17/00; A46B 2200/202; A46B 15/00; A46B 15/0095; F16M 13/02; F16M 13/005; B44D 3/123
USPC ........................................... 248/683; 24/303
See application file for complete search history.

(56) References Cited

U.S. PATENT DOCUMENTS

| 2009/0041557 A1* | 2/2009 | Lin ........................ B60J 7/104 410/97 |
| 2011/0083254 A1* | 4/2011 | Trutna ................... A41F 1/002 2/326 |
| 2013/0333131 A1* | 12/2013 | McCarthy .......... A46B 15/0095 15/159.1 |

FOREIGN PATENT DOCUMENTS

FR    2704531 A1 * 11/1994 ............. B44D 3/123

* cited by examiner

*Primary Examiner* — Jack W Lavinder
(74) *Attorney, Agent, or Firm* — Mark S Hubert

(57) ABSTRACT

A clip capable of magnetic attachment to a paintbrush or to a steel paint roller mesh tray. It has a hook arm extending from the body of the clip that enables a hanging attachment to a plethora of different sized paint cans and at different vertical angles. The clip may be used with continued attachment to the paintbrush where the paintbrush is hung on the paint can when necessary by the hook arm. It may also be used with continued attachment to a steel paint roller mesh tray and the paintbrush is magnetically affixed on the tray when necessary. A ferromagnetic backing cup may be used to direct the bulk of the magnetic flux to either side of the clip body.

7 Claims, 9 Drawing Sheets

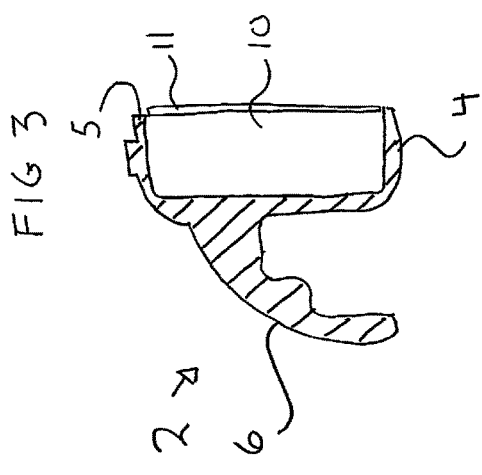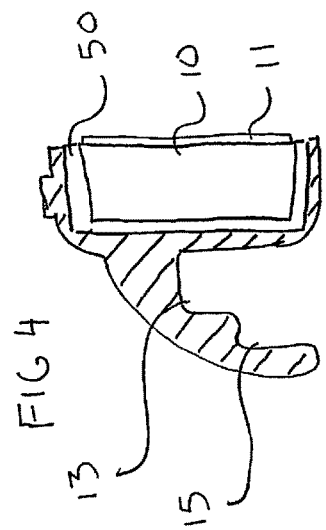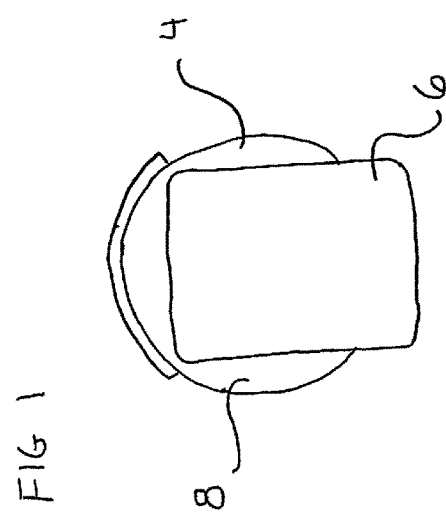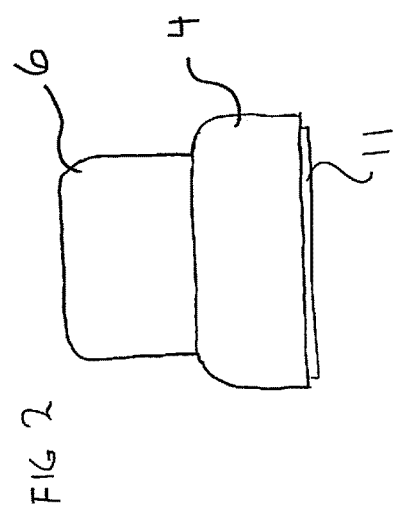

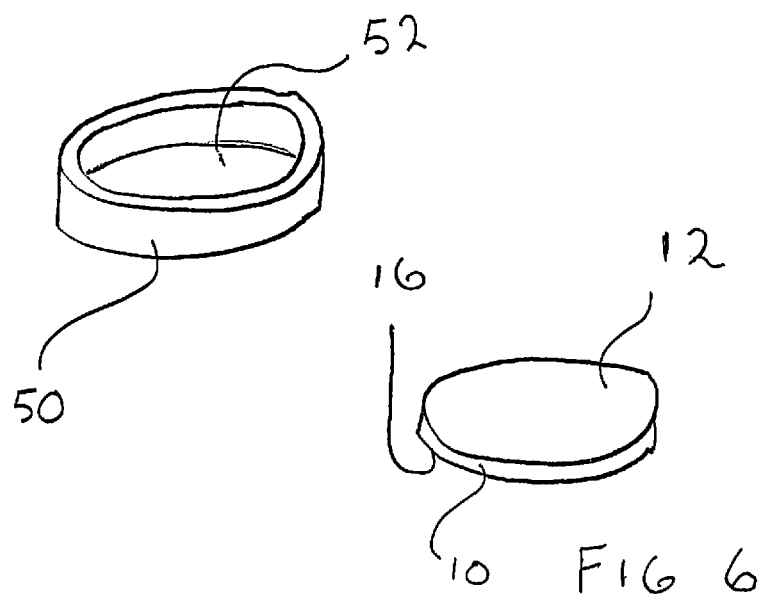

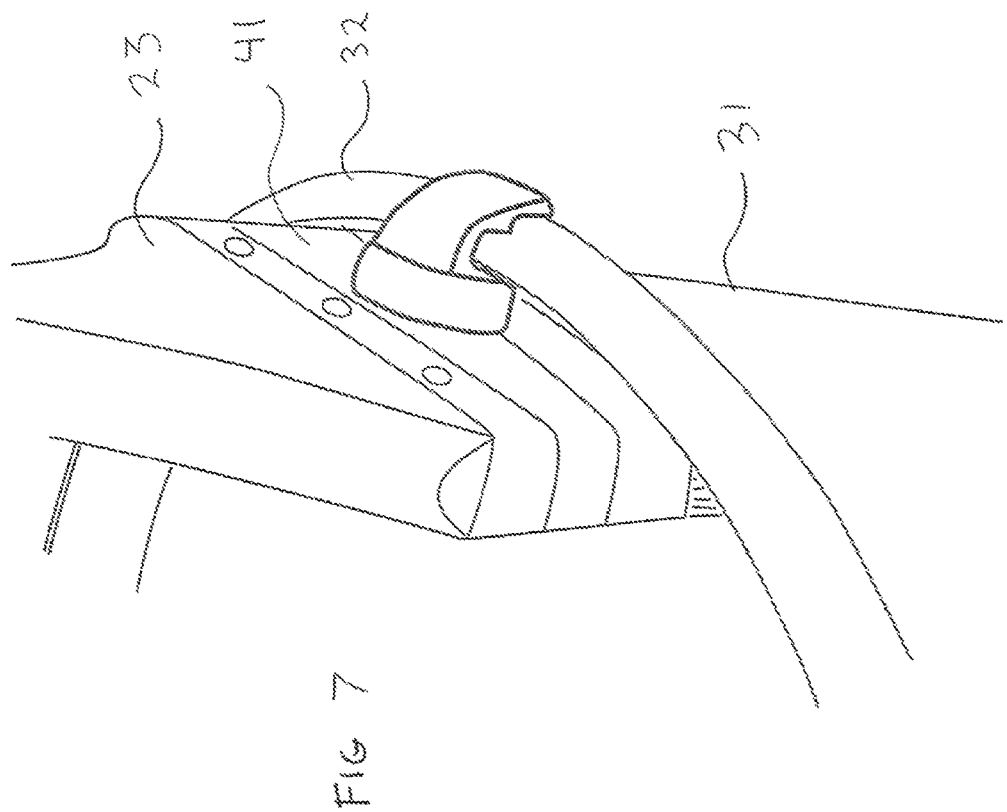

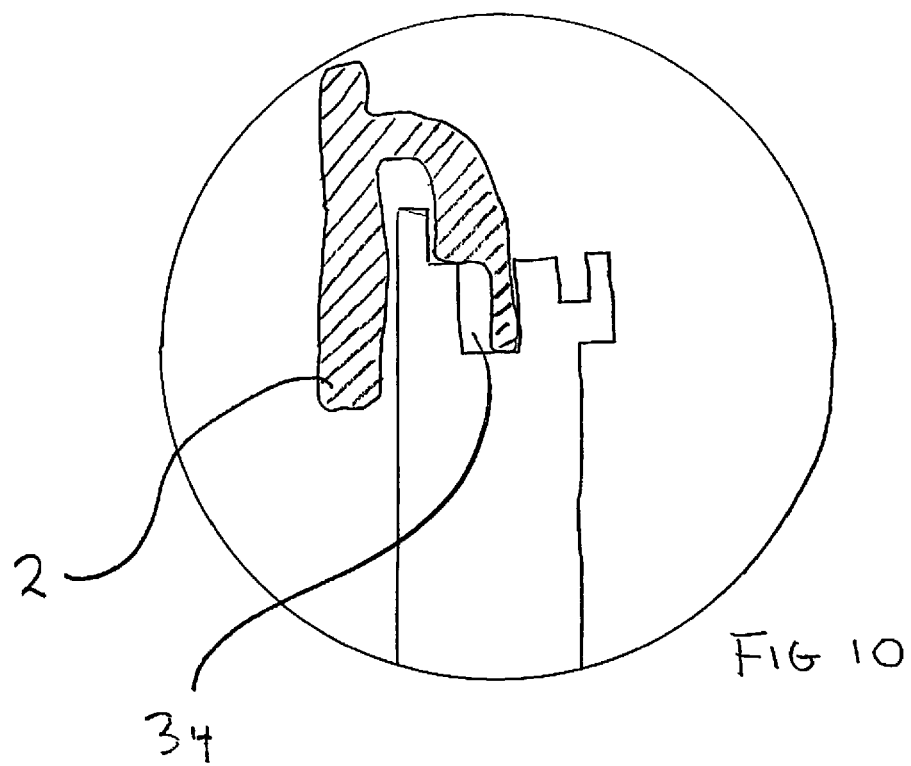

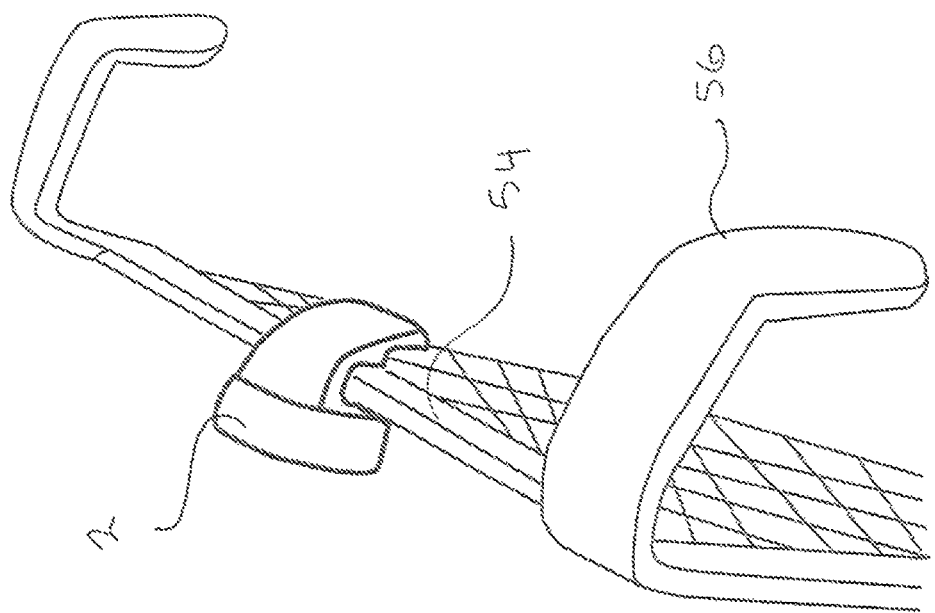

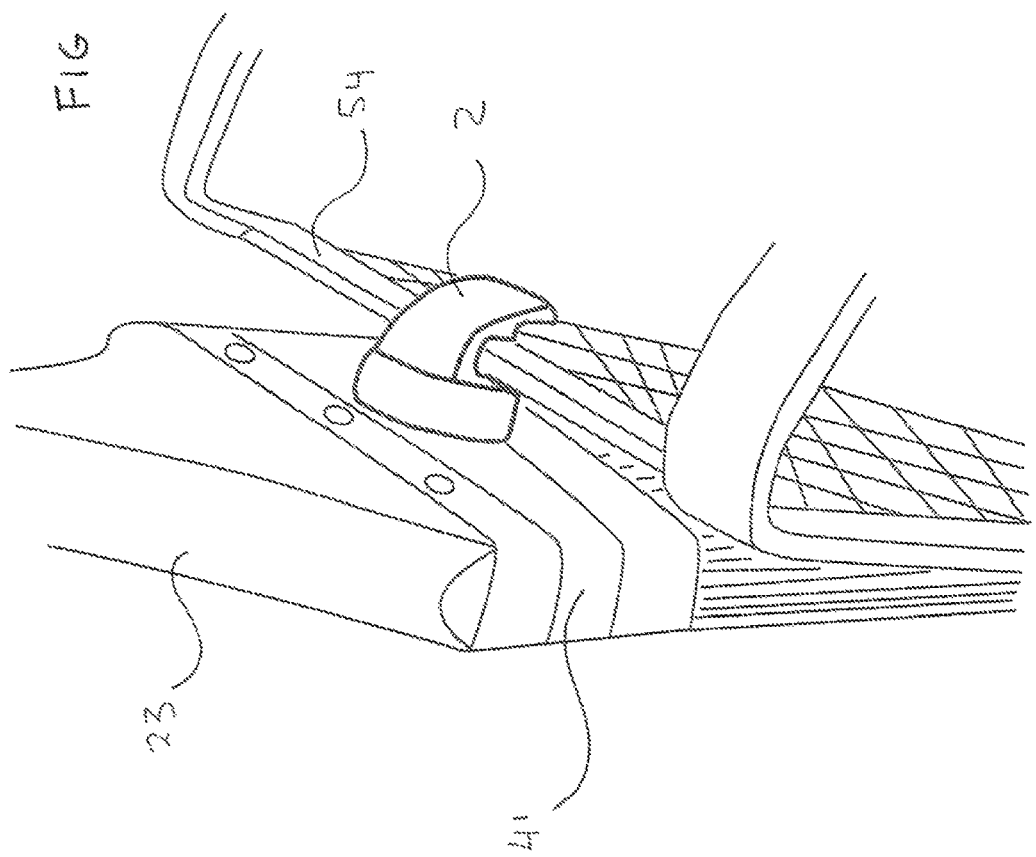

PAINTBRUSH CLIP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to painter's aids, and more particularly to the securement of a wet paintbrush onto a plethora of painting related vessels, cans cutting pots, trays, screens and the like.

BACKGROUND

Typically, painters are required to place their wet paintbrush in the bottom of the paint can or cutting pot when doing something else. This often immerses the bristles of the paintbrush deeper than desirable, and tends to create a mess on the paintbrush and bristles. Leaving a wet paintbrush exposed to the open air is not an option as many of the newer waterborne finishes dry extremely fast and would make the bristles stick together and ruin the brush if allowed to dry. Laying the paintbrush down subjects it to picking up debris. Lastly, the option of washing the bristles each time the brush is not being momentarily used, both wastes time and loosens the bristles from their tight grouping in the brush. Once the paintbrush has been cleaned it is generally left in a clean container to dry. Unfortunately is usually rests on some of the bristles slowing the drying process and distorting the lay of the brush's bristles.

While there have been several different devices developed in the prior art that will hold a paintbrush, each is specific to use with a certain vessel, can cutting pot, tray, screens or the like. None of the previous devices works in all situations.

Henceforth, an improved paintbrush holder that is adapted to being used in various ways and with various different painting paraphernalia would fulfill a long felt need in the painting industry. This new invention utilizes and combines known and new technologies in a unique and novel configuration to overcome the aforementioned problems and accomplish this.

A more compact, convenient and adaptable device for holding a wet paintbrush to a variety of paint related vessels and operational devices at vertical and non vertical angles is provided by the embodiments set forth below.

BRIEF SUMMARY

In accordance with various embodiments, a device for hanging a wet paintbrush on the inside top of the rim of any size of paint vessel, at different vertical anglers, therein preventing excess paint from gathering on the brush.

In one aspect, an inexpensive, magnetic paintbrush holder is provided, capable of securement to a plethora of painting equipment.

In a further aspect, a magnetic paintbrush holder is provided for the suspended transportations and or air drying of a recently cleaned paintbrush.

In yet another aspect, a paintbrush holder is provided that is capable of magnetic retention on the metal band around the paintbrush for temporary suspension of the paintbrush by physical engagement of a hooking means onto an article of painting equipment.

In yet another aspect, a paintbrush holder is provided that is capable of physical engagement onto an article of painting equipment with a hooking means so as to allow for the temporary magnetic suspension of the paintbrush.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1 is a front view of the paintbrush clip;

FIG. 2 is a top view of the paintbrush clip;

FIG. 3 is a side cross sectional view of the paintbrush clip;

FIG. 4 is a side cross sectional view of a second embodiment paintbrush clip with a backing plate cup installed in the roller screen mode position;

FIG. 5 is a perspective view of a ferromagnetic magnet cup;

FIG. 6 is a perspective view of a circular, planar disc magnet;

FIG. 7 is a perspective view of the paintbrush clip in use with a five gallon paint can;

FIG. 10 is a cross sectional side view of the upper wall of a one gallon paint can;

FIG. 12 is a perspective view of the paintbrush clip installed on a roller screen;

FIG. 13 is a perspective view of the paintbrush clip installed on a roller screen magnetically attached to a paintbrush band;

DETAILED DESCRIPTION OF CERTAIN EMBODIMENTS

Figure 11:
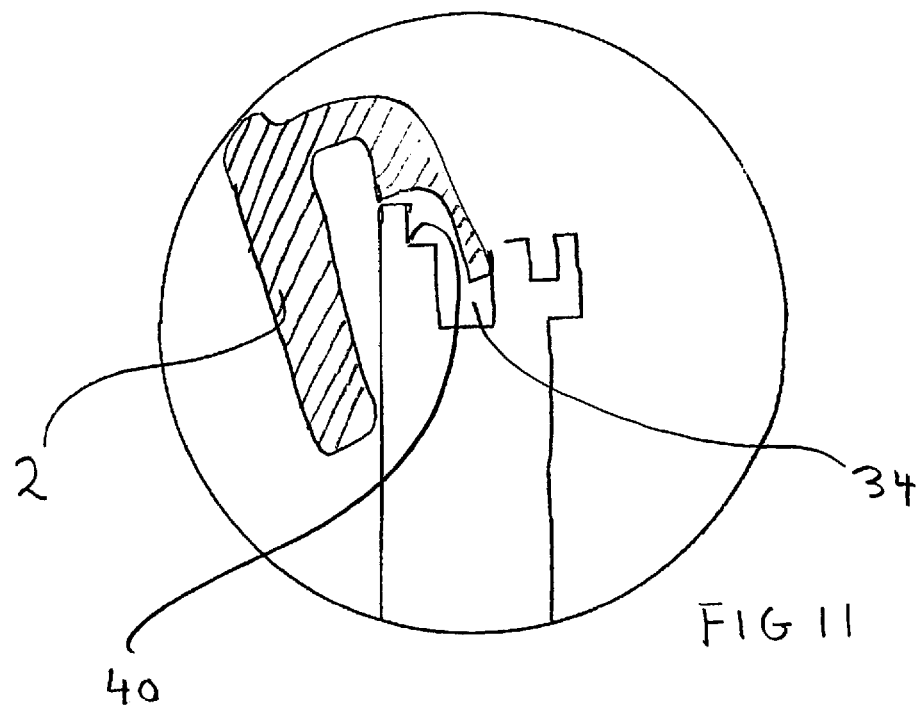
FIG. 11 is a cross sectional side view of the clip held at a vertical angle on upper wall of a one gallon paint can.
Figure 8:
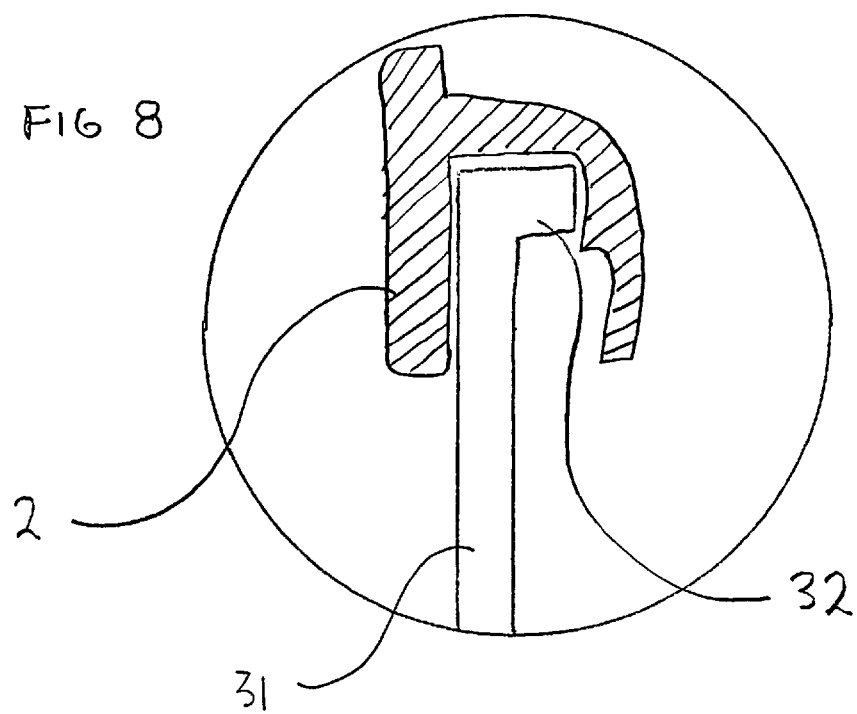
FIG. 8 is a cross sectional side view of the upper wall of a five gallon paint can.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a paint brush hanger, that has a toothed hook that is capable of attachment to paint cans and vessels of various sizes from one quart to five gallons. The hook has a magnet affixed onto its body such that one, planar face of the magnet extends to the rear face of the hook. The magnet is sunk into the body of the hook such that its proximal planar face resides approximately even with the top edge of the stopped bore. (Approximately herein means even with, slightly above or slightly below the edge of the stopped bore up to and including a height equal to one half of the thickness of the magnet.) There is a thin, non-slip polymer pad affixed to the exposed face of the magnet. (Optionally, the magnet may be coated with a non slip polymer.) Simply stated, it is a small device to assist painters of any level with protecting their paint brushes from being ruined by excess paint and it allows a a way to uniformly air dry a cleaned paintbrush.

Looking at FIGS. 1-3 it can be seen that the paintbrush clip 2 has a generally cylindrical body 4 having a first planar face (back side) and a second, generally parallel planar face (front side), with a hook arm 6 extending normally therefrom the back side 8 of the clip. Embedded into a stopped bore or recess formed in the front side 5 of the body 4 is a magnet 10 (FIG. 4 shows a second embodiment with a reversible ferromagnetic backing plate 50 and planar disc magnet 10 combination). In the preferred embodiment, the magnet 10 (FIG. 6) is a cylindrical/disc configuration from the rare earth family of magnets. The proximal planar face 12 of the magnet 10 extends flush or slightly beyond the of the front side 5 of the body 4. There is a non-slip surface 11 on the planar face 12 that may be accomplished with a surface treatment or an affixed disc. The magnet 10 and reversible backing plate 50 may be frictionally affixed into the recess or they may be mechanically or chemically constrained therein. Optionally, the body 4 of the clip 2 may completely envelop all faces of the magnet 10 if the magnet is cast inside the body mold. In this alternate configuration the non-slip material or treatment would be affixed to the body, atop of the region of the body adjacent to the proximal planar face 12 of the magnet.

Figure 9:
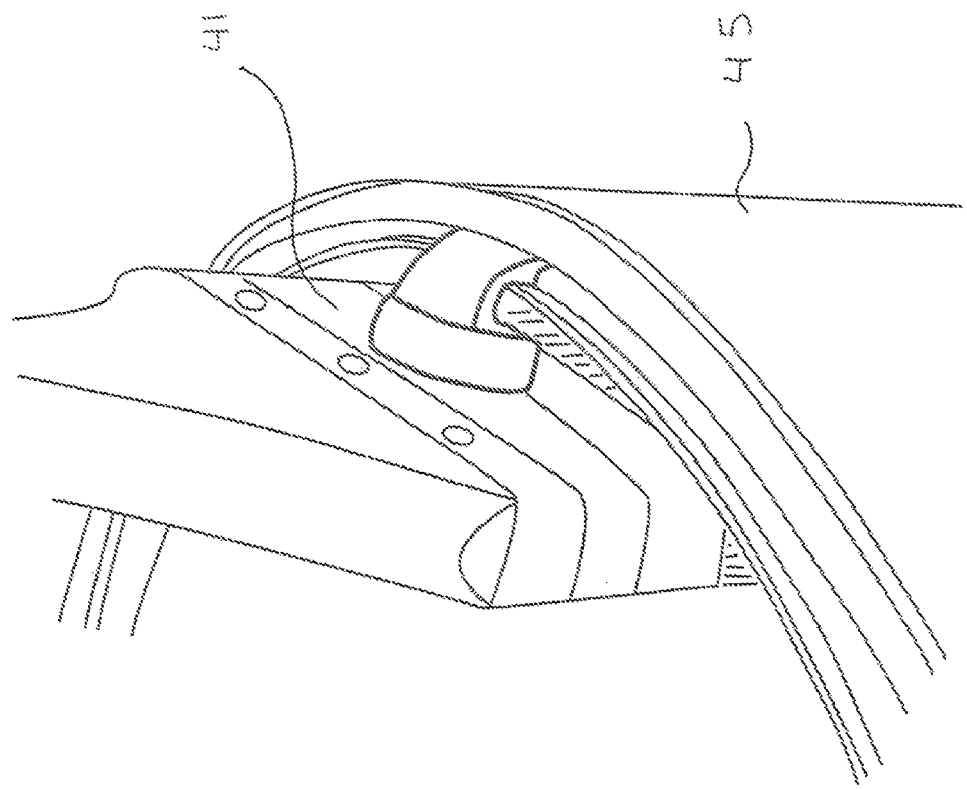
FIG. 9 is a perspective view of the paintbrush clip in use with a one gallon paint can.

The hook arm 6 is designed with an internal stepped configuration defining a first, lower resting ridge 15 and a second, narrower, upper resting ridge Each of these ridges are rounded along their edges and have an arc running across their faces. Stated otherwise, their inner faces are horizontally curved. This arcing contour conforms better to the curved lips and rims of a paint can. The arc lies in the horizontal plane of the inner faces of the hook arm as the paintbrush clip would be operationally hooked on a paint can. (See FIGS. 7 and 9.)

Preferably, the magnet 10 is a Neodymium magnet as they loose less than 1% of their Gaussian force over 10 years. These are used for their great strength and in the preferred embodiment are selected in a size possessing a minimum holding strength of 15 pounds force with a preferred strength of 21 pounds force.

It is to be noted that while the paintbrush 23 may be secured confidently to a stationary paint can 25 with much less force, the painter will be often be holding the can and its attached brush as they walk, and climb scaffolding/ ladders, all the while jarring and jostling the paint can. Thus the need for a magnet with an attractive force exceeding the weight of the paint loaded brush alone.

Since magnetic attraction is only necessary in one direction a ferromagnetic cup (open toward the face of the clip) may be used around the distal planar face 16 of the magnet to direct the Gaussian field toward the exposed, proximal face 12 of the magnet. In an alternate embodiment, a ferromagnetic backing plate 50 (either a cup or washer) is installed into the body of the clip so as to allow for the focusing of the magnet's Gaussian fields. The distal side 16 of the disc magnet 10 is placed against the washer backing plate. (If a cup backing plate 50 is used, it has a bore 52 therein sized to matingly accept the magnet 10.) (FIGS. 5 and 6) The natural field of a magnet is polar radiating loops and disc magnets have equal fields. When a ferromagnetic backing plate is placed against one side of a magnet it creates a more efficient path for the magnetic flux lines to follow. It also creates a radiating pattern favoring one pole, which effectively points the majority of the magnetic energy in one direction. Such a configuration can increase the magnetic strength by approximately four times. When the magnet cup is securely installed in the clip, it will also greatly lessen the possibility of the magnet dislodging from the clip.

Figure 14:
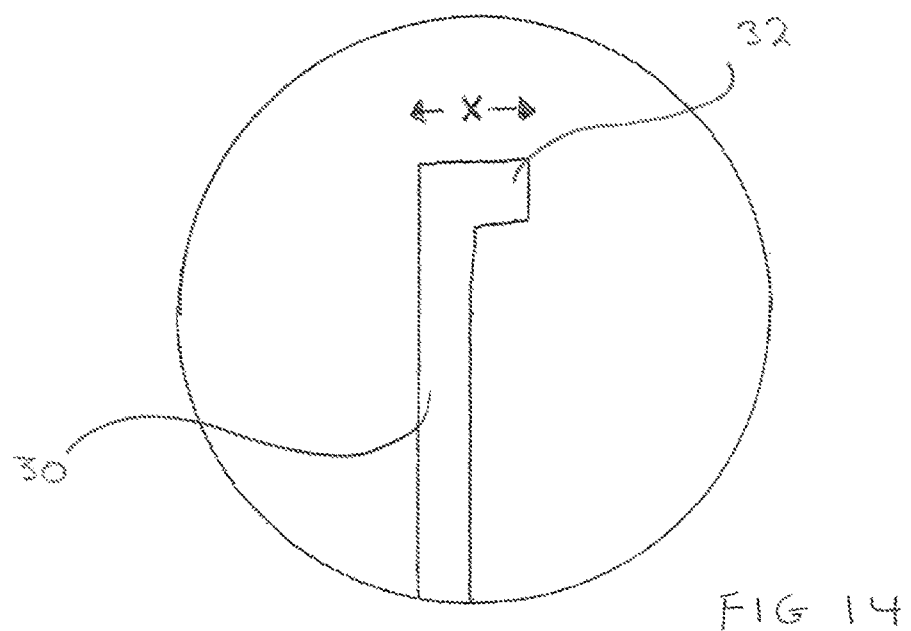
FIG. 14 is a cross sectional side view the upper wall of a five gallon paint can.

Looking at FIG. 14, a cross sectional side view of a five gallon paint can 31 best be seen. The side wall 30 terminates in a rolled flange 32. The thickness of the rolled flange 32 has a thickness X which is less than the opening between the clip's inner wall and the upper resting ridge 13. FIG. 7 shows the paintbrush clip 2 magnetically affixed to the steel band of the paintbrush and hanging on the lip of a five gallon paint can 31.

Figure 15:
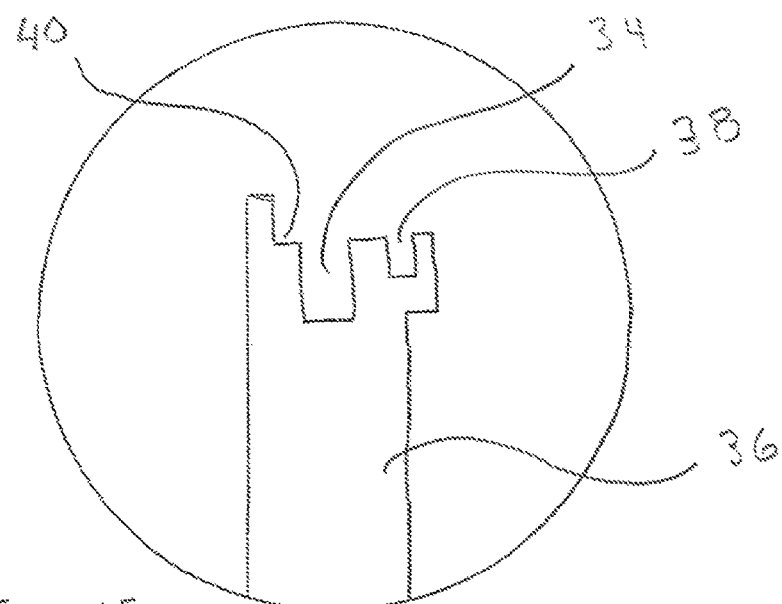
FIG. 15 is a cross sectional side view the upper wall of a one gallon paint can.

Looking at FIG. 15 a cross sectional view of a one gallon and one quart paint can is best seen. Here, the top end of the side wall 36 has an inner circumferential trough 34, an outer circumferential trough 38, and an inner rabbeted lip 40 adjacent the inner trough 34.

There are two distinct modes of using the paintbrush clip 2 depending upon what device it is being used with. In the paint can mode, when using the clip 2 with a paint can, the exposed magnetic face of the clip 2 is pressed against the metal face of the paintbrush band 41 so as to lock the clip 2 and the paintbrush 23 together. The hook 6 is fitted over the top edge of the paint can. If the paint can is one gallon or one quart sized can 45, then the lower resting ridge 15 is engaged over and will abut the inner circumferential trough 34 on the top of the paint can until it touches the bottom of the trough and the paintbrush will be held suspended in a vertical fashion over the open paint can. (FIG. 9) If the paint can is of the five gallon size then the upper resting ridge 13 will be used to fit over and abut the rolled flange 32. (FIG. 7)

Optionally, with the one gallon and one quart paint cans 45, the lower resting ridge 15 can be engaged over the rabbeted lip 40 of the paint with the clip on a forward tilting angle such that the tip of the lower resting ridge 15 contacts the rear sidewall of the inner trough 34. In this mode the paintbrush will be suspended on a vertical angle over the open paint can. (FIG. 11) The painter simply lifts the paintbrush and the magnetically attached clip vertically from its suspended position over the paint can to use. The paintbrush clip remains affixed magnetically to the paintbrush at all times. After the painting is completed and the brush is cleaned, it may then be hung to air dry onto any steel surface (like the inside walls of a painter's van, or the side of a paint can.)

In the roller screen mode of using the paintbrush clip, (FIGS. 12 and 13) the clip 2 is detached from the paintbrush's metal band and is frictionally clipped over the top bar 54 of a paint roller screen 56 by the hook. (These roller screens are metal and mounted so as to reside vertically within a five gallon paint can.) The clipping force in conjunction with the magnetic force between the back side of the clip and the steel paint roller screen 56 exceed the magnetic force between the front side of the clip 2 and the paintbrush's metal band 41. The paintbrush can thus be magnetically attached to the clip and suspended off the top bar of the roller screen while the painter exchanges the paintbrush momentarily for a paint roller assembly. (This is commonly used where a painter is alternately rolling and cutting in a room with a paint roller assembly and an angled sash brush.) When the painter wants to use the paintbrush he merely grabs it by the top of the handle and pulls it forward, thereby releasing the magnetic grip between the clip and the paintbrush's metal band. Here the paintbrush clip stays with the most attractive forces, those on paint roller screen (in the paint can), not the brush. After the paintbrush is washed, the clip is removed from the paint roller screen.

It is to be noted that the ability of the clip to remain on the bar 54 of the paint roller screen 56 is accomplished by the addition of the magnetic attraction between the rear side of the clip 2 and the roller screen. However the sum of this magnetic attraction and the clipping force of the clip on the paint roller screen must exceed the attraction between the front side of the clip and the paintbrush. This can be accomplished in two ways. First, by placement of the magnet 10 into the recess in the clip body to a depth close enough to the rear side of the clip to accomplish this. This depth varies with the size and strength of magnet, the clipping force and the mass of the clip. Such depth is simply determined through conducting a series of tests as would be known by one skilled in the art. The depth of the stopped bore in the body of the paintbrush clip is adjusted to suit the use of the device.

In the second method, with the alternate embodiment, the ferromagnetic backing plate is oriented so as to direct much of the magnet's magnetic fields towards the rear of the clip. The type and thickness of the backing plate (washer or cup) will, in conjunction with the size and strength of the magnet have to be experimentally determined through conduction of a series of tests which would be known by one skilled in the art.

The non-slip polymer disc or coating 11 on the side of the magnet 10 or backing plate 50 at the front face of the clip will prevent the paintbrush from slipping about the clip, regardless of the method of use.

It is to be noted that the backing plate 50 and the magnet 10 may be removeably installed (reversible) into the recess in the clip such that the magnetic fields are strongest toward the hook side of the clip (back side 8) or such that the magnetic fields are strongest toward the front side of the clip. This allows the clip to be switched between the paint can mode and the roller screen mode. The switching of the installed order of the ferromagnetic backing plate and the magnet into the mating recess in the body of the clip will direct the strongest magnetic field toward the front side or rear side of the clip. Directing the magnetic field towards the front side of the clip allows the clip to remain on the paintbrush for the paint can mode and directing the magnetic field toward the rear side of the clip allows the clip to remain on the roller screen for the roller screen mode. The direction of the strongest field will determine the mode of use.

In the preferred embodiment the body of the clip is made of a polymer, however a steel or metal body may also be used.

While certain features and aspects have been described with respect to exemplary embodiments, one skilled in the art will recognize that numerous modifications are possible. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A paint brush clip comprising;
   a cylindrical body having a stopped bore formed therein and a hook arm extending therefrom; and
   a magnet having a planar distal face and a proximal face, said proximal face having a non-slip surface treatment applied thereto;
   wherein said magnet is affixed inside in said stopped bore such that said planar distal face resides approximately even with an outer edge of said stopped bore; and
   wherein said body has a first planar face and a generally parallel, second planar face, wherein said hook arm extends from said first planar face and said stopped bore extends into said body from said second planar face; and
   wherein said hook arm has an upper resting ridge formed thereon and an adjacent lower resting ridge formed thereon and disposed between an inner face of said hook and an outer face of said body of said clip.

2. The paintbrush clip of claim 1 wherein said hook arm, with its upper resting ridge and said lower resting ridge has a horizontally curved inner face.

3. The paintbrush clip of claim 2 wherein said magnet is a planar, rare earth magnet, said magnet having a proximal planar face and a distal planar face.

4. The paintbrush clip of claim 3 wherein said rare earth magnet has a minimum magnetic holding force of 15 pounds force.

5. The paintbrush clip of claim 1 further comprising a ferromagnetic backing element, said backing element sized for retention in said stopped bore and wherein said magnet and said backing element reside adjacent to each other.

6. A paint brush clip comprising;
- a cylindrical body having a stopped bore formed therein and a hook arm extending therefrom; and
- a magnet having a planar distal face and a proximal face, said proximal face having a non-slip surface treatment applied thereto, wherein said magnet is affixed inside in said stopped bore such that said planar distal face resides approximately even with an outer edge of said stopped bore; and
- a ferromagnetic backing element, said backing element sized for retention in said stopped bore and wherein said magnet and said backing element reside adjacent to each other; and wherein said ferromagnetic backing element is a ferromagnetic backing disk affixed onto said proximal face of said magnet.

7. The paintbrush clip of claim 6 wherein an order of said magnet and said backing element are reversible within said stopped bore of said clip body.

\* \* \* \* \*